United States Patent [19]
Vaida

[11] Patent Number: 4,760,912
[45] Date of Patent: Aug. 2, 1988

[54] CONVEYOR HANGER WITH CIRCULAR WEDGE GRIPPER

[75] Inventor: Robert M. Vaida, Ellington, Conn.

[73] Assignee: Gerber Garment Technology, Inc., Tolland, Conn.

[21] Appl. No.: 56,459

[22] Filed: May 29, 1987

[51] Int. Cl.[4] ............................................. B65G 47/74
[52] U.S. Cl. ................................. 198/678; 198/803.7; 294/103.1; 294/81.6; 294/143; 248/316.3; 211/113; 211/89
[58] Field of Search ............. 198/803.3, 803.7, 803.14, 198/465.4, 678; 294/103.1, 81.6, 143, 162; 248/316.2, 316.3, 309.1, 317; 211/89, 113, 115; 24/67.9, 134 KB, 134 N

[56] References Cited

U.S. PATENT DOCUMENTS 3,434,686  3/1969  Aoi ................................... 248/316.3
3,960,264  6/1976  Carbine et al. ................. 198/678 X
4,085,848  4/1978  Tsuhe ........................... 248/316.3 X
4,603,777  8/1986  Pearl et al. ..................... 294/81.6 X

FOREIGN PATENT DOCUMENTS 2016071  9/1979  United Kingdom .

Primary Examiner—Robert J. Spar
Assistant Examiner—D. Glenn Dayoan
Attorney, Agent, or Firm—McCormick, Paulding & Huber

[57] ABSTRACT

A hanger for use in a conveyorized system for transporting limp sheet material, has a gripper, for relesably holding a unit of work material to the holder, including a sliding and rotatable circular wedge element cooperating with a fixed gripping surface, whereby both sides of the gripped work unit are engaged along straight lines to produce a strong and distributed holding effect on the work unit resisting downward displacement of the work unit from the hanger while nevertheless allowing the work unit to be pulled sideways from the holder with a relatively small force.

14 Claims, 3 Drawing Sheets

CONVEYOR HANGER WITH CIRCULAR WEDGE GRIPPER

BACKGROUND OF THE INVENTION

This invention relates to a hanger for holding one or more pieces of limp material, such as textile garment pieces either as individual pieces or as groups or stacks of such pieces, and for attachment to a conveyer trolley for moving the pieces from work station to work station in a conveyorized garment making plant or the like, and deals more particularly with an improved construction of such a hanger having one or more grippers for releasably holding work material to the hanger.

The general purpose of the hanger of this invention is similar to that of the hanger shown in co-pending U.S. patent application Ser. No. 794,630, entitled CONVEYOR HANGER WITH A PLURALITY OF MOVABLE GRIP ELEMENTS and assigned to the same assignee as this application. The hanger of this application is in some respects an improvement on the hanger of said application.

The general object of this invention is to provide a conveyor hanger having at least one gripper capable of releasably holding in place a unit of work material against a relatively large force tending to pull the work unit downwardly out of the hanger, thereby suiting the hanger to use with relatively large and heavy work units, the work unit nevertheless being easily withdrawn from the hanger by pulling it sideways from the hanger, a gripping element of the gripper being rotatable during such sidewise pulling movement to facilitate the same.

Another object of the invention is to provide a gripper construction which may readily be used in a conveyor hanger having either a single gripper or a number of grippers.

Further objects and advantages of the invention will be apparent from the following description of the preferred embodiments and from the accompanying drawings forming a part hereof.

SUMMARY OF THE INVENTION

The invention resides in a hanger for a conveyorized system for transporting pieces of limp sheet material from work station to work station and involves the hanger having a body carrying a straight pin fixed at one end to the body and beyond said one end extending away from the body toward the opposite free end. A circular wedge element is mounted on the straight pin for sliding and rotational movement and has a conical external gripping surface. Cooperating with this conical gripping surface is a fixed gripping surface formed on the hanger body. The fixed gripping surface is generally planar and is arranged at such an angle to the longitudinal axis of the pin that the gripping surface of the circular wedge element engages or faces the fixed gripping surface along a line parallel to the fixed gripping surface. A unit of work material inserted between the fixed gripping surface and the circular wedge element is therefor engaged along a straight line both by the fixed gripping surface and the gripping surface of the circular wedge element to exert a strong and distributed grip on the material. The fixed gripping surface is inclined to the vertical and the circular wedge element is provided with barb shaped ribs on its gripping surface to further enhance the gripping power of the gripper.

DETAILED DESCRIPTION OF THE PREFERRED EMBODIMENTS

Figure 1:
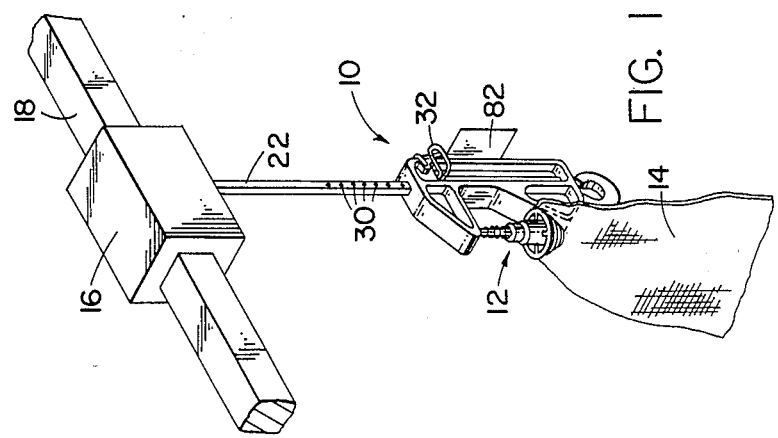
FIG. 1 is a perspective view showing a portion of a conveyor system using a hanger embodying the present invention, the parts of the conveyor apart from the hanger being shown only schematically.

FIGS. 1–7 show a hanger 10 comprising one embodiment of the invention and having a single gripper 12 for holding a single unit 14 of work material. As shown in FIG. 1 the hanger 10 is connected to a trolley 16 riding on a rail 18, all of which may form a part of a conveyor system for transporting limp sheet material, such as the unit 14, from work station to work station in a garment making plant or the like. The trolley 16 and track 18 may take any one of various well known forms, and as is also well known, the track 18 usually has associated with it a moving chain or other powered element for moving the trolley 16, and others like it, along the track, and switchs are generally included in this system for directing the trolleys and hangers to various desired points in the plant. When a trolley and associated hanger 10 reach a work station the trolley is generally separated or separable from the driving chain so that the trolley and hanger can remain stationary relative to the work station while an operator loads and/or unloads material onto or from the hanger or works on the material carried by the hanger. Depending on circumstances, the unit 14 of work material may be either a single sheet or work piece, or a stack or group of such sheets or work pieces.

Figure 5:
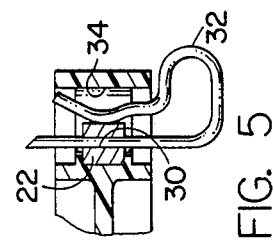
FIG. 5 is a fragmentary horizontal sectional view taken on the lines 5—5 of FIG. 2.
Figure 2:
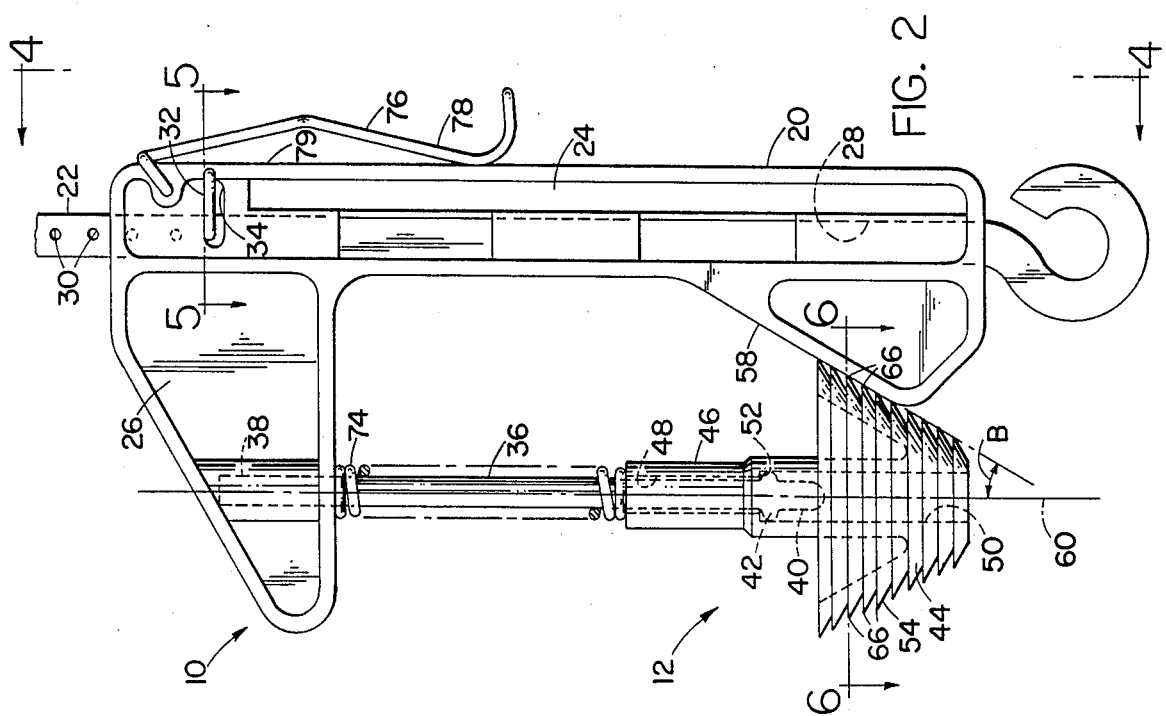
FIG. 2 is a front elevational view of the hanger of FIG. 1.
Figure 3:
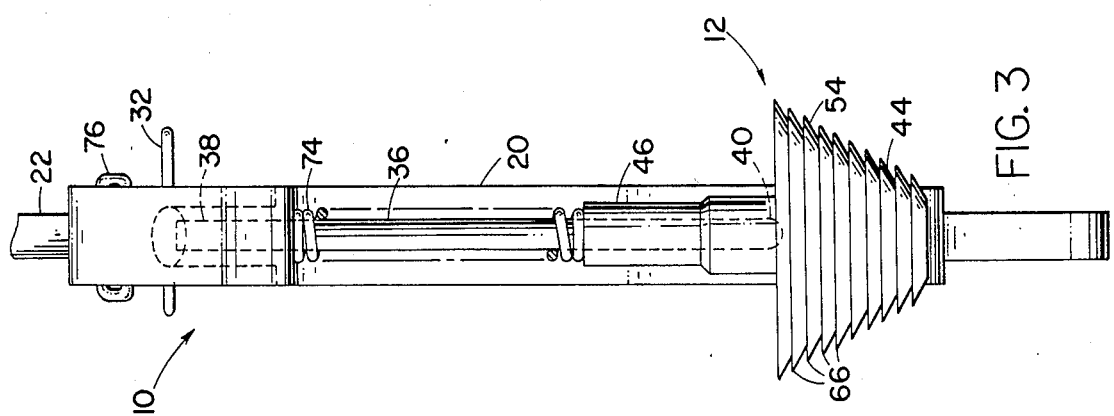
FIG. 3 is a side elevational view of the hanger of FIG. 1 taken looking toward the right in FIG. 2.

Turning to FIGS. 2–7 for further details of the hanger 10, the hanger consists of a body 20 made of a rigid material, such as nylon or other molded plastic. The body 20 is adapted to be carried by a rod 22 which hangs vertically downwardly from the trolley 16. FIGS. 1, 2 and 3 show the hanger in its normal operating orientation. As viewed in this orientation the body includes a vertically extending portion 24 and a top portion 26 extending horizontally outwardly from one side of the vertical portion 24. The vertical portion has a vertical bore 28 extending entirely therethrough from the upper to the lower end of the portion 24 for slidably receiving the rod 22. The axis of the bore 28 may be taken as the vertical axis of the body 20. The rod 22 includes a number of transverse openings 30, spaced along its length, through any one of which a retaining clip 32 may be inserted, as shown in FIG. 5, to hold the body 20 in a fixed position, both axially and angularly, on the rod 22. The clip 32 is readily removable from one hole 30 and replaceable in another to adjust the vertical height of the hanger body 20 relative to the rod. The hanger body 20 has a transverse slot 34 for accommodating the clip 32.

The top part 26 of the hanger body carries a straight pin 36 of circular cross-section. The pin has an upper end 38 fixed to the top part 26 by being received in and adhesively secured to an opening in the top part. From its upper end the pin 36 extends downwardly beyond the top part 26 of the hanger body to a free end 40 having a radially enlarged flange 42 which may be provided by a snap ring or outwardly swaged portion of the rod.

A circular wedge element 44 is carried by the pin 36. As shown best in FIG. 6 the wedge element 44 has an upper stem portion 46 with a central opening 48 closely conforming to the outer surface of the pin so as to support the wedge element on the pin for both sliding motion along and rotational movement about the longitudinal axis 60 of the pin. Below the opening 48 the wedge member has an opening 50 of larger diameter sufficient to accomodate the diameter of the flange 42. Between the opening 48 and the opening 50 is a radial shoulder 52 engagable with the flange 42 to limit downward movement of the wedge element 44 on the pin 36. Such engagement does not, however, occur during normal operation of the gripper and is primarly of use during assembly of the hanger.

The circular wedge element 44 has a lower portion with a generally conical external gripping surface 54. As shown best in FIG. 7, the surface 54 is actually a truncated cone having an apparent apex 56 and a cone angle A. This cone angle A may vary and is preferably within the range of 15 to 45 degrees. In the illustrated case of FIG. 7 it is 30 degrees.

The conical gripping surface 54 of the circular wedge element cooperates with a fixed gripping surface 58 formed on the lower end of the vertical portion 24 of the hanger body 20. This fixed gripping surface 58 is generally planar in shape and is arranged on the body 20 so as to be parallel to the adjacent portion of the gripping surface 54 of the circular wedge member. More particularly, with reference to FIG. 2, a reference plane can be designated which is parallel to the drawing sheet and which contains the longitudinal axis 60 of the pin 36. Such reference plane is indicated at 62 in FIG. 6. The fixed gripping surface 58 is located in a plane perpendicular to this reference plane 62 and as measured in such reference plane is inclined relative to the longitudinal axis 60 of the pin 32 by an angle B equal to the cone angle A of the ciruclar wedge element 44. Therefore, regardless of the thickness of the work unit inserted between the fixed gripping surface 58 and the circular wedge element 44, both the fixed gripping surface 58 and the circular wedge element will engage the work unit along straight lines to exert a distributed holding or clamping force on the work unit.

Figure 6:
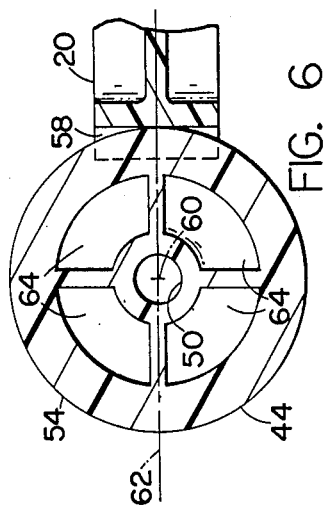
FIG. 6 is a fragmentary horizontal sectional view taken on the lines 6—6 of FIG. 2.
Figure 7:
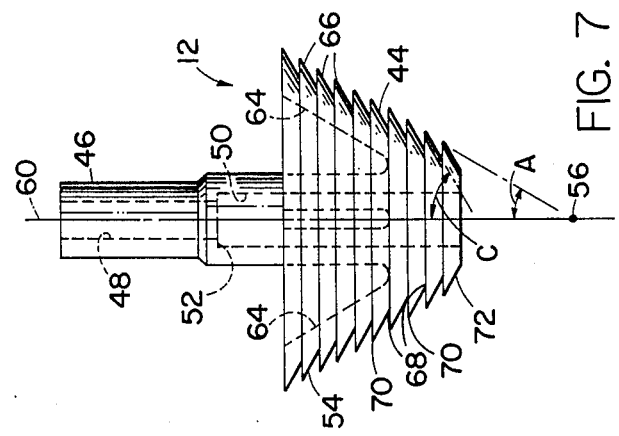
FIG. 7 is a side elevational view, in an enlarged scale, of the circular wedge element of the hanger of FIG. 1.
Figure 4:
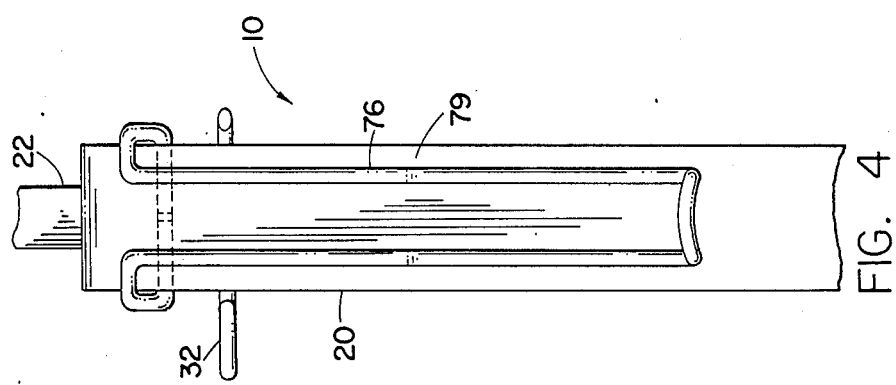
FIG. 4 is a fragmentary side elevational view of the hanger of FIG. 1 taken looking toward the left in FIG. 2, this view being on a slightly larger scale than FIG. 2.

The circular wedge element 44 is preferably made of a molded plastic such as urethane or polyethylene. Further, to avoid dimpling or other distortions in the surface of the wedge element, which might occur due to shrinkage, as the molded plastic cools and solidifies after molding, if it were made as a substantially solid molded part, it is preferably designed so as to be of a thin walled construction throughout. Therefore, as best seen in FIGS. 6 and 7 it is designed so as to have four hollow pockets 64 giving it the illustrated and desired thin walled character.

To enhance the gripping effect of the circular wedge member 44 on the inserted work unit, the conical gripping surface 54 is preferably, as shown, made as a plurality of circular barb shaped ribs 66 concentric with the longitudinal axis 60 of the pin 36. More particularly, and as seen in FIG. 7, in proceeding away from the apex 56 each rib 66 has first and second ends 68 and 70 located in planes perpendicular to the longitudinal axis 60. The first end 68 of each rib is located closer to the apex 56 then the end 70. Further, for each rib 66 the end 70 is of larger diameter then the end 68, and such end 70 is also of larger diameter then the end 68 of the next adjacent rib. Each rib 66 between its end 68 and its end 70 further includes a conical intermediate external surface 72 having a cone angle C substantially larger than the cone angle A. In the illustrated case of FIG. 7 this cone angle C is 60 degrees while the cone angle A is 30 degrees.

A suitable spring means urges the circular wedge element 44 downwardly on the pin 36 toward the fixed gripping surface 58. Preferably and as illustrated, this spring means consists of a helical compression spring 74 received on the pin 36 and working between the top of the wedge element 44 and the top portion 26 of the hanger body. FIG. 7 shows the circular wedge element 44 in its lowermost condition at which its conical gripping surface 54 engages the fixed gripping surface 58. From this lowermost position the element may be raised by hand on the pin 36 and against the resilient force of the spring 74 to allow the insertion of a work unit, as shown at 14 in FIG. 1, between the wedge element and the fixed gripping surface. Thereafter, when the wedge element 44 is manually released through the biasing force of the spring 74, it will grip the work unit between itself and the fixed gripping surface 58 to securely hold the work unit to the hanger body. When it is desired to remove the work unit from the hanger the wedge element 44 may be raised by hand on the pin 36 to release it from gripping engagement with the work unit and to allow the work unit to be pulled or fall downwardly out of the hanger. As an alternative, however, the work unit may also be removed from the hanger by pulling it sideways away from the hanger. In the course of such sideways pulling the circular wedge element 44 will rotate on the pin 36 to permit the movement of the work unit to take place with a minimum of sidewise pulling force exerted on the work unit.

In respect to the loading or unloading of a work unit into or out of the hanger 10 it should also be noted that the lower end 40 of the pin 36 is located within the confines of the circular wedge element 44 and does not project below the lower end of the wedge element. Therefore, it does not interfere in any way with the insertion or removable of the work unit from the hanger.

It may sometimes be desireable to temporarily attach a cardboard ticket or the like to the hanger for some reason, as for example to identify the hanger itself or the work unit inserted in the hanger. As an alternative, it may be desired to temporarily attach to the larger cloth labels to be sewn or otherwise attached to the product or products made from the work unit carried by the hanger. For this purpose, the hanger 10 includes a spring clip 76 made of bent spring wire and having a tongue 78 overlying a portion of the back surface 80 of the vertical portion 24 of the hanger body and spring biased into engagement with such back surface. Therefore, a ticket or label, such as shown at 82 in FIG. 1, may be releasably held to the hanger by slipping it between the tongue 78 of the spring clip and the back surface 80 of the hanger body.

Figure 8:
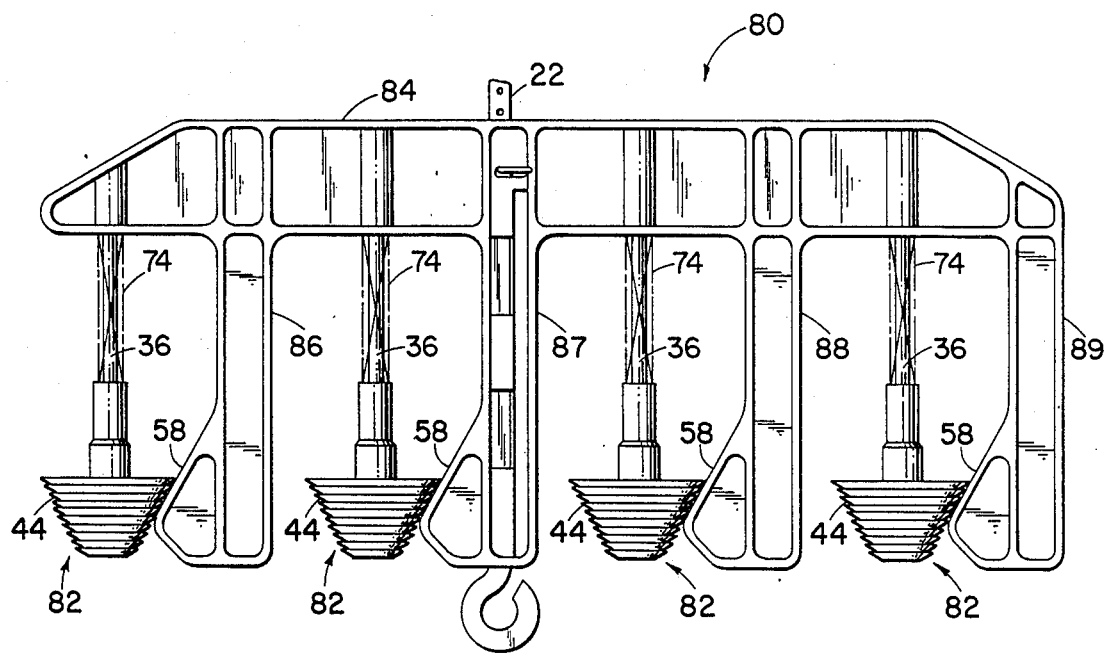
FIG. 8 is a front elevational view of a hanger comprising another embodiment of this invention and including a plurality of grippers similar to the single gripper of the FIG. 1 hanger.

The hanger 10 shown in FIGS. 1-7 includes a single gripper 12. It will be understood, however, that the illustrated gripper 12 may be used with other designs of hangers having more than one gripper. By way of example, FIG. 8 shows a hanger 80 having four grippers 82,82 each of which is substantially identical to the gripper 12 of the hanger 10. The hanger 80 has a single body 84 of molded plastic or the like providing four separate downwardly extending portions 86, 87, 88 and 89 each providing a fixed gripping surface 58 for a respective one of the grippers 82. Otherwise the parts of the hanger 80 are the same as those of the hanger 10, have been given the same reference numbers as in FIGS. 1-7, and need not further be described.

Figure 9:
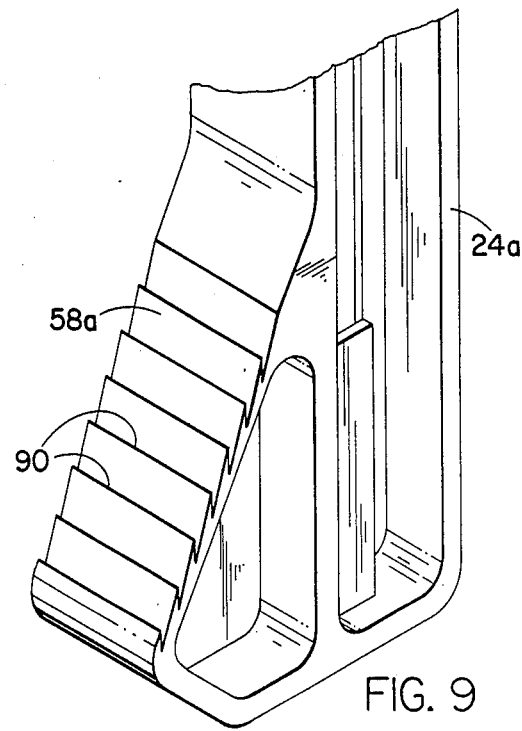
FIG. 9 is a fragmentary perspective view in enlarged scale of the lower end of the body of a hanger comprising another embodiment of the invention.

In both the hanger 10 of FIGS. 1-7 and the hanger 80 of FIG. 8 the fixed gripping surface 58 of each gripper 12 or 82 is shown to be a generally flat surface. However, if desired this surface may also be formed with ribs, knurling or other roughening features to enhance its gripping effect on the inserted work unit. By way of example, FIG. 9 shows the lower end of a body portion 24a of a hanger having a fixed and roughened gripping surface 58a which may be substituted for each flat surface 58 of the previously described hangers 10 and 80. In particular, the surface 58a is comprised of a plurality of teeth or ribs 90 which extend generally horizontally across the surface 58a and which have their free edges directed generally upwardly and toward the vertical portion 24a of the hanger body. This direction of the teeth causes them to bite into the inserted work unit in such a way as to resist downward movement of the unit. At the same time the horizontal direction of the teeth minimizes their hindering the pulling of the inserted work unit sideways from the hanger.

I claim:

1. A hanger for use in a conveyorized system for transporting limp material from work station to work station, said hanger comprising:
   a body,
   a substantially straight pin having a longitudinal axis and first and second ends, said pin being fixed to said body at said one end and beyond said one end extending away from said body to said second end,
   a circular wedge element mounted on said pin for rotation relative to said pin about said longitudinal axis and for sliding movement relative to said pin along said longitudinal axis,
   said circular wedge element having an external generally conical gripping surface concentric with said longitudinal axis of said pin and having a given general cone angle with respect to said longitudinal axis of said pin,
   a generally planar fixed gripping surface on said body cooperable with said conical gripping surface of said circular wedge element to grip a work unit between said circular wedge element and said fixed gripping surface,
   said fixed gripping surface being perpendicular to a reference plane containing said longitudinal axis and, as measured in said reference plane, being inclined relative to said longitudinal axis by an angle substantially equal to said cone angle, and
   spring means for urging said circular wedge element along said longitudinal axis of said pin toward said fixed gripping surface of said body so as to resiliently press said circular wedge element against a workpiece inserted between said circular wedge element and said fixed gripping surface.

2. A hanger as defined in claim 1 further characterized by said generally conical gripping surface of said circular wedge element including a plurality of circular ribs concentric with said longitudinal axis of said pin.

3. A hanger as defined in claim 2 further characterized by each of said circular ribs being generally barb shaped.

4. A hanger as defined in claim 2 further characterized by said conical gripping surface of said circular wedge element having an apparent apex, said ribs of said conical gripping surface being arranged adjacent to one another in proceeding away from said apex along said longitudinal axis of said pin, each of said ribs having first and second ends located in planes perpendicular to said lonitudinal axis of said pin with said first end of each rib being located closer to said apex and being of smaller diameter than said second end, said first end of each rib also being of smaller diameter than the second end of the adjacent rib which is located closer to said apex, each of said ribs further including an intermediate external conical surface extending between its said first end and its said second end which intermediate surface has a cone angle relative to said longitudinal axis of said pin greater than said general cone angle of said external gripping surface of said circular wedge element.

5. A hanger as defined in claim 1 further characterized by said circular wedge element being made of plastic and including hollow spaces giving it a thin wall construction substantially at all places.

6. A hanger as defined in claim 1 further characterized by said spring means being a helical compression spring received on said pin and working between said body and said circular wedge element to urge said circular wedge element away from said first end of said pin.

7. A hanger as defined in claim 1 further characterized by a spring clip attached to said body and having a tongue resiliently pressed toward said body to resiliently hold to said body a ticket inserted between said tongue and said body.

8. A hanger as defined in claim 1 further characterized by said circular wedge element having a normal range of sliding movement relative to said pin, and said second end of said pin being located within the confines of said circular wedge element throughout movement of said circular wedge element within said normal range of sliding movement.

9. A hanger as defined in claim 1 further characterized by said hanger body having a vertical axis which is oriented vertically when said hanger is in its normal mode of use, and said fixed gripping surface being inclined relative to said vertical axis and facing partially upwardly when said hanger is in said normal mode of use.

10. A hanger as defined in claim 9 further characterized by said longitudinal axis of said pin being substantially parallel to said vertical axis of said body.

11. A hanger as defined in claim 1 further characterized by there being a plurality of straight pins such as aforesaid fixed to said body, there being a plurality of circular wedge elements similar to the one aforesaid each received on a respective one of said pins, there being a plurality of fixed gripping surfaces such as aforesaid on said body each respectively associated with a respective one of said wedge elements, and there being a plurality of spring means such as aforesaid each associated with a respective one of said circular wedge elements for urging such circular wedge element toward its associated fixed gripping surface.

12. A hanger as defined in claim 1 further characterized by said fixed gripping surface including roughening features.

13. A hanger as defined in claim 12 further characterized by said roughening features being ribs extending horizontally across said fixed gripping surface.

14. A hanger as defined in claim 13 further characterized by said ribs having a free edge directed generally upwardly and away from said longitudinal axis of said pin.

* * * * *